United States Patent
Li et al.

(10) Patent No.: US 6,689,859 B2
(45) Date of Patent: Feb. 10, 2004

(54) HIGH FRACTURE TOUGHNESS HYDROSILYATION CURED SILICONE RESIN

(75) Inventors: Zhongtao Li, Midland, MI (US); Frederick J. McGarry, Weston, MA (US); John R. Keryk, Midland, MI (US); Bizhong Zhu, Midland, MI (US); Dimitris E. Katsoulis, Tokyo (JP)

(73) Assignee: Dow Corning Corporation, Midland, MI (US)

( * ) Notice: Subject to any disclaimer, the term of this patent is extended or adjusted under 35 U.S.C. 154(b) by 15 days.

(21) Appl. No.: 10/092,055

(22) Filed: Mar. 5, 2002

(65) Prior Publication Data

US 2003/0171486 A1 Sep. 11, 2003

(51) Int. Cl.$^7$ .................. C08G 77/06; C08G 77/12; C08G 77/20
(52) U.S. Cl. ............... 528/12; 528/31; 528/32; 528/33; 528/34; 528/43; 528/15; 525/477; 525/478
(58) Field of Search ................. 525/477, 478; 528/15, 31, 32, 12, 33, 34, 43; 264/236, 331.11

(56) References Cited

U.S. PATENT DOCUMENTS

| | | | | |
|---|---|---|---|---|
| 4,529,789 A | * | 7/1985 | Kroupa | 528/15 |
| 4,686,271 A | * | 8/1987 | Beck et al. | 528/15 |
| 5,623,030 A | * | 4/1997 | Tsumura et al. | 525/478 |
| 5,747,608 A | * | 5/1998 | Katsoulis et al. | 525/477 |
| 5,939,500 A | * | 8/1999 | Itoh et al. | 525/478 |
| 6,310,146 B1 | * | 10/2001 | Katsoulis et al. | 525/477 |
| 6,509,423 B1 | * | 1/2003 | Zhu | 525/478 |
| 2002/0143132 A1 | * | 10/2002 | Kobayashi et al. | 528/10 |

* cited by examiner

*Primary Examiner*—Jeffrey B. Robertson
(74) *Attorney, Agent, or Firm*—Clark Hill PLC

(57) ABSTRACT

A hydrosilylation reaction curable composition that includes a silsesquioxane polymer, a mixture of silanes or siloxanes as a cross-linking compound and a hydrosilylation reaction catalyst. The curable composition is cured to form a cured resin having high fracture toughness and strength without the loss of elastic modulus.

13 Claims, No Drawings

HIGH FRACTURE TOUGHNESS HYDROSILYATION CURED SILICONE RESIN

FIELD OF THE INVENTION

The invention relates to a cured silsequioxane resin having high fracture toughness and strength without loss of elastic modulus. With more particularity the invention relates to a cured silsequioxane resin that includes a mixture of silanes or siloxanes as a cross-linking compound resulting in an improved fracture toughness.

BACKGROUND OF THE INVENTION

Silsesquioxane resins have seen increased use in industrial applications in transportation (automotive, aerospace, naval) and other manufacturing industries. Silsequioxane resins; exhibit excellent heat and fire resistant properties that are desirable for such applications. These properties make the silsesquioxane resins attractive for use in fiber-reinforced composites for electrical laminates, structural use in automotive components, aircraft and naval vessels. Thus, there exists a need for rigid silsesquioxane resins having increased flexural strength, flexural strain, fracture toughness, and fracture energy, without significant loss of modulus or degradation of thermal stability. In addition, rigid silsesquioxane resins have low dielectric constants and are useful as interlayer dielectric materials. Rigid silsesquioxane resins are also useful as abrasion resistant coatings. These applications require that the silsesquioxane resins exhibit high strength and toughness.

Conventional thermoset networks of high cross-link density, such as silsesquioxane resins, typically suffer from the drawback that when measures are taken to improve a mechanical property such as strength, fracture toughness, or modulus, one or more of the other properties suffers a detriment.

Various methods and compositions have been disclosed in the art for improving the mechanical properties of silicone resins including: 1) modifying the silicone resin with a rubber compound, as disclosed in U.S. Pat. No. 5,747,608 which describes a rubber-modified resin and U.S. Pat. No. 5,830,950 which describes a method of making the rubber-modified resin; 2) adding a silicone fluid to a silicone resin as disclosed in. U.S. Pat. No. 5,034,061 wherein a silicone resin/fluid polymer is adapted to form a transparent, shatter-resistant coating.

While the above referenced patents offer improvements in the toughness of silicone resins, there is an additional need to further improve the toughness of silicone materials for use in high strength applications, such as those described above.

Therefore, it is an object of this invention to provide a process that may be utilized to prepare a cured silsesquioxane resin having high fracture toughness with minimal loss of modulus.

SUMMARY OF THE INVENTION

A hydrosilylation reaction curable composition including a silsesquioxane polymer, a mixture of silanes or siloxanes as a cross-linking compound, and a hydrosilylation reaction catalyst.

DETAILED DESCRIPTION OF THE PREFERRED EMBODIMENTS

This invention relates to a hydrosilylation reaction curable composition that is used to prepare a cured silsesquioxane resin. This curable composition comprises: (A) a silsesquioxane copolymer, (B) a mixture of silanes or siloxanes as a cross-linker, (C) a compound catalyst, (D) an optional reaction inhibitor and (E) an optional solvent.

Component (A) is a silsesquioxane copolymer comprising units that have the empirical formula $R^1_a R^2_b R^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen. Preferably, $R^1$ is an alkenyl group such as vinyl or allyl. Typically, $R^2$ and $R^3$ are nonfunctional groups selected from the group consisting of alkyl and aryl groups. Suitable alkyl groups include methyl, ethyl, isopropyl, n-butyl, and isobutyl groups. Suitable aryl groups include phenyl groups. Suitable silsesquioxane copolymers for component (A) are exemplified by $(PhSiO_{3/2})_{0.75}(ViMe_2SiO_{1/2})_{0.25}$, where Ph is a phenyl group, Vi represents a vinyl group, and Me represents a methyl group.

Component (B) is a mixture of silanes and/or siloxanes that contain silicon hydride functionalities that will cross-link with the vinyl group of component (A). The silanes or siloxanes utilized in the mixture should have at least two Si—H or silicon hydride functionalities and can be represented by the general formula:

$H_a R^1_b Si$ wherein $a \geq 2$ and $R^1$ is a hydrocarbon for the silane, and $H_a R^1_b Si_c O_{(4c-a-b)/2}$ for the siloxane where $a \geq 2$, $b \geq 4$, $c \geq 2$ and $R^1$ is a hydrocarbon.

Component B should comprise a mixture of silanes and/or siloxanes that exhibit a synergistic effect. Such a synergistic effect is exemplified by a cured silsesquioxane resin produced utilizing the mixture that has a greater fracture toughness than a cured resin produced utilizing any of the components of the mixture alone as the cross-linking compound.

The mixture preferably includes 2 components in which the components range from 20 to 80 molar % of the mixture and even more preferably from 30 to 70 in molar % of the mixture. An example of a preferred mixture of silanes and siloxanes, is a mixture of diphenyl silane and hexamethyl-trisiloxane. Such compounds are commercially available from Gelast, Inc. of TulIt, Pa. and United Chemical Technologies, Inc. of Bristol, Pa.

Components (A) and (B) are added to the composition in amounts such that the molar ratio of silicon bonded hydrogen atoms (SiH) to unsaturated groups (C=C) (SiH:C=C) ranges from 1.0:1.0 to 1.5:1.0. Preferably, the ratio is in the range of 1.1:1.0 to 1.5:1.0. If the ratio is less than 1.0:1.0, the properties of the cured silsesquioxane resin will be compromised because curing will be incomplete. The amounts of components (A) and (B) in the composition will depend on the number of C=C and Si—H groups per molecule. However, the amount of component (A) is typically 50 to 80 weight % of the composition, and the amount of component (B) is typically 2 to 50 weight % of the composition.

Component (C) is a hydrosilylation reaction catalyst. Typically, component (C) is a platinum catalyst added to the composition in an amount sufficient to provide 1 to 100 ppm of platinum based on the weight of the composition. Component (C) is exemplified by platinum catalysts such as chloroplatinic acid, alcohol solutions of chloroplatinic acid, dichlorobis(triphenylphosphine)platinum(II), platinum chloride, platinum oxide, complexes of platinum compounds with unsaturated organic compounds such as olefins, complexes of platinum compounds with organosiloxanes containing unsaturated hydrocarbon groups, such as Karstedts catalyst (i.e. a complex of chloroplatinic acid with 1,3-divinyl-1,1,3,3-tetramethyldisiloxane) and 1,3-diethenyl-1,1,3,3-tetramethyldisiloxane, and complexes of platinum compounds with organosiloxanes, wherein the complexes are embedded in organosiloxane resins. A particularly preferred catalyst is a 1% platinum-divinyltetramethyldisiloxane complex commercially available from Chemical Technologies, Inc. of Bristol, Pa.

Component (D) may include an optional catalyst inhibitor, typically added when a one part composition is prepared. Suitable inhibitors are disclosed in U.S. Pat. No. 3,445,420 to Kookootsedes et al., May 20, 1969, which is hereby incorporated by reference for the purpose of describing catalyst inhibitors. Component (D) is preferably an acetylenic alcohol such as methylbutynol or ethynyl cyclohexanol. Component (D) is more preferably ethynyl cyclohexanol. Other examples of inhibitors include diethyl maleate, diethyl fumamate, bis (2-methoxy-1-methylethyl) maleate, 1-ethynyl-1-cyclohexanol, 3,5-dimethyl-1-hexyn-3-ol, 2-phenyl-3-butyn-2-ol, N, N, N', N'-tetramethylethylenediamine, ethylenediamine, diphenylphosphine, diphenylphosphite, trioctylphosphine, diethylphenylphosphonite, and methyidiphenylphosphinite.

Component (D) is present at 0 to 0.05 weight % of the hydrosilylation reaction curable composition. Component (D) typically represents 0.0001 to 0.05 weight % of the curable composition. Component (D) preferably represents 0.0005 to 0.01 weight percent of the total amount of the curable composition. Component (D) more preferably represents 0.001 to 0.004 weight percent of the total amount of the curable composition.

Components (A), (B), (C) and (D) comprise 10 to 99.9 weight % of the composition. The composition may further comprise one or more optional components such as reaction inhibitors, processing additives or other components known in the art.

The hydrosilylation reaction curable composition comprising components (A), (B), and (C), and any optional components can be dissolved in component (E), an optional solvent. Typically, the amount of solvent is 0 to 90 weight %, preferably 0 to 50 weight % of the curable composition. The solvent can be an alcohol such as methyl, ethyl, isopropyl, and t-butyl alcohol; a ketone such as acetone, methylethyl ketone, and methyl isobutyl ketone; an aromatic hydrocarbon such as benzene, toluene, and xylene; an aliphatic hydrocarbon such as heptane, hexane, and octane; a glycol ether such as propylene glycol methyl ether, dipropylene glycol, methyl ether, propylene glycol n-butyl ether, propylene glycol n-propyl ether, and ethylene glycol n-butyl ether; a halogenated hydrocarbon such as dichloromethane, 1,1,1-trichloroethane and methylene chloride; chloroform; dimethyl sulfoxide; dimethyl formamide; acetonitrile and tetrahydrofuran. A preferred solvent is toluene.

There is also disclosed a process for preparing a hydrosilyation reaction curable composition comprising the steps of:
a) providing a silsesquioxane polymer;
b) providing a mixture of silanes or siloxanes as a cross-linking compound;
c) mixing the components of a), and b) to form a curable composition;
d) adding a hydrosilylation reaction catalyst to the curable composition of step c)
e) adding an optional reaction inhibitor to the catalyst of step d) before or after mixing the reaction catalyst with the curable composition;
f) curing the curable composition of step e) to form a cured resin having high fracture toughness.

The silsesquioxane polymer, as described previously, is first mixed with the cross-linking compound, as disclosed above. After the components above are mixed, the hydrosilylation catalyst is mixed into the composition and the mixture is poured into a mold. The mixing of the curable composition of the present invention may also include the step of degassing the composition before curing. Degassing is typically carried out by subjecting the composition to a mild vacuum.

The mold is then subjected to the following curing steps: 1) curing the curable composition in the mold at a temperature of 85° C. for 24 hours, 2) curing the curable composition in the mold at a temperature of 150° C. for 24 hours, 3) curing the curable composition in the mold at a temperature of 200° C. for 24 hours.

It should be realized that the silicone resins mixed with any Si—H functional cross-linkers can be used as a continuous phase for fiber reinforced composites. Such fiber reinforcements can include any common reinforcement fibers such as quartz, glass graphite, etc.

EXAMPLES

The following examples are intended to illustrate the invention to those skilled in the art and should not be interpreted as limiting the scope of the invention as set forth in the appended claims.

Reference Example 1

Three Point Flexural Testing

The three point bending test was performed on an Instron 4500 per ASTM standard D 790-961. The cured resin specimens prepared in the Examples described below were cut into 5.08 cm ×1.27 cm specimens using a band saw. The specimens were then machined to a thickness of 0.25 cm. The specimens were tested using a cross head speed of 1 mm/min and a support span of 3.81 cm.

During testing, force-displacement curves were recorded. The toughness of the cured resin was obtained as the area under the stress-strain curves. The flexural strength was calculated using the peak force as:

$$S=3PL/2bd^2$$

where S is the stress in the outer surface at the mid span, P the maximum load, L the support span, and b and d are the width and thickness of the beam. The maximum strain was calculated, using the maximum displacement, as:

$$\epsilon = 6Dd/L^2$$

where $\epsilon$ is the strain at break and D is the maximum displacement. The slope of the steepest initial straight-line portion of the load-displacement curve was taken as the Young's modulus.

Reference Example 2

Fracture Toughness Testing

The plane strain fracture toughness, $K_{Ic}$, was obtained per ASTM D 5045-96, and the critical strain energy release rate, $G_{Ic}$, was calculated from $K_{Ic}$ based on Linear Elastic Fracture Mechanics (LEFM) assumptions. 5.08 cm×0.95 cm samples were cut using a band saw and a notch was cut at the center of the specimen. A natural crack extending from the root of the notch to about half of the width was produced by gently tapping a sharp razor blade into the notch. Samples were conditioned at 73° C. for at least twenty-four hours before testing to allow full relaxation of deformation. The displacement rate of the test was 10 mm/minute with a support span of 3.81 cm.

$$K_{Ic} = (P/(BW^{1/2}))f(x)$$

where P is the highest load and:

$$f(x) = 6x^{1/2}(1.99 - x(1-x)(2.15 - 3.93x + 2.7x^2))/((1+2x)(1-x)^{3/2})$$

where x is the pre-crack to specimen width ratio, a/W. After the test the pre-crack length was measured. Only those specimens with a value between 0.45 to 0.55 were considered valid. The variation of x across the thickness should be less than 10%. The validity of the test was further ensured by comparing the sample dimensions with the estimated plastic zone size enlarged by approximately 50:

$$B, a, (W-a) > 2.5(K_{Ic}/\gamma_y)^2$$

where $\gamma_y$ is the yield stress of the sample.

$G_{Ic}$ was calculated by:

$$G_{Ic} = K^2_{Ic}(1 - \nu^2)/E$$

where upsilon, the Poisson's ratio of the resin, was neglected to simplify the experiment. For a glassy polymer with a Poisson's ratio of 0.3, $G_{Ic}$ was exaggerated by about 9%. However, the relative ranking of $G_{Ic}$ values would not be obscured since the change of the square of the Poisson's ratio is usually small from one resin to another of similar stiffness.

Reference Example 3

Dynamic Mechanical Analysis

Dynamic mechanical analysis was carried out on a Seiko Dynamic Mechanical Rheology Station DMS 200. A specimen 20 mm long, 4 mm wide and 1 mm thick was mounted in two grips 14 mm apart. The specimen was then subjected to a sinusoidal tensile displacement at a frequency of 1 Hertz. The tension was measured and the storage and loss moduli and the loss factor were calculated. The tests were performed at temperatures ranging from −150 to 350° C. All tests were performed in a nitrogen environment with a gas flow rate of 200 ml/min.

Example 1

The silsesquioxane resin $(PhSiO_{3/2})_{0.75}(ViMe_2SiO_{1/2})_{0.25}$ was utilized as the base resin for forming a cured resin.

A mixture of two silicon hydride (hexamethyltrisiloxane and diphenylsilane) containing cross-linking agents was utilized in varying molar ratios as detailed in Table 1. Table 1 indicates the amount of each component added in grams, and also indicates the molar % of the total mixture of the cross-linking agents utilized. D indicates diphenylsilane and P indicates hexamethyltrisioxane in Table 1.

The silsesquioxane resin was a 75% solution in toluene; therefore, to reduce the amount of toluene, the resin was heated in a vacuum oven under 50 mmHg at 50–60° C. for 30 minutes. Approximately 40–50% of the toluene was removed as a result of the process.

The mixture of cross-linking agents was first added to the processed silsesquioxane resin, and then a hydrosilyation reaction catalyst of a 2.09 wt % platinum complex of vinyl terminated polydimethylsiloxane was added.

The mixture was stirred vigorously for 5 to 10 minutes and then transferred to a mold. The mold was degassed in a vacuum oven at room temperature under 50 mmHg for 10 minutes to remove trapped air from the mixing step.

The mold was then moved to an air circulating oven and subjected to the following curing sequence: 85° C. for 24 hours, 150° C. for 24 hours, 200 for 24 hours. After the final step, the casting was removed from the oven for testing. The results of the tests for each sample are displayed in table 2.

TABLE 1

Recipes for Various Cross-linked Molar Ratios

| SAMPLE | Component A(g) | D(g) | P(g) | D/P molar ratio | Catalyst (ppm) |
|---|---|---|---|---|---|
| 1 | 60 | 14.33 | 0 | 100/0 | 1 |
| 2 | 60 | 10.03 | 3.8 | 70/30 | 30 |
| 3 | 60 | 7.17 | 6.33 | 50/50 | 30 |
| 4 | 60 | 4.3 | 8.86 | 30/70 | 30 |
| 5 | 60 | 0 | 12.65 | 0/100 | 30 |

TABLE 2

| SAMPLE | Young's Modulus (KSi) | Flexural Strength (KSi) | Flexural Strain | $K_{IC}^{1/2}$ (Mpam) | $G_{IC}(J/M^2)$ |
|---|---|---|---|---|---|
| 1 | 76.2 (3.1) | 2.70 (0.21) | 10.27 (1.20) | 0.58 (0.05) | 582.25 (17.1) |
| 2 | 137.78 (5.22) | 4.23 (0.14) | 8.63 (0.78) | .72 (0.05) | 87.68 (10.55) |
| 3 | 167.54 (5.41) | 5.06 (0.21) | 7.31 (0.37) | 0.49 (0.04) | 210.23 (34.34) |
| 4 | 201.2 (6.4) | 6.00 (0.29) | 5.94 (1.16) | 0.47 (0.03) | 155.02 (11.43) |
| 5 | 204 (7.37) | 6.89 (0.29) | 7.35 (0.96) | 0.35 (0.02) | 550.72 (69.73) |

As can be seen from the above results, a molar ratio of 70/30 of D to P exhibits a fracture toughness value $K_{IC}$ of 0.72 MPam$^{1/2}$ which is higher than either of D or P alone, with values of $K_{IC}$ of 0.35 and 0.58, respectively.

While a preferred embodiment is disclosed, a worker in this art would understand that various modifications would come within the scope of the invention. Thus, the following claims should be studied to determine the true scope and content of this invention.

What is claimed is:

1. A hydrosilylation reaction curable composition comprising:
   a) a silsesquioxane polymer comprising a copolymer resin having the empirical formula $R^1_a R^2_b R^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen;
   b) a mixture of silane and/or siloxane cross-linking compounds; and
   c) a hydrosilylation reaction catalyst;
   the cured composition displaying a fracture toughness that is greater than the fracture toughness of a cured composition formed utilizing any of the individual cross-linking compounds of the mixture alone.

2. The hydrosilylation reaction curable composition of claim 1 wherein the silsesquioxane resin comprises $(PhSiO_{3/2})_{0.75}(ViMe_2SiO_{1/2})_{0.25}$, where Ph is a phenyl group, Vi represents a vinyl group, and Me represents a methyl group.

3. The hydrosilylation reaction curable composition of claim 1 wherein the mixture of cross-linking compounds is formed of silanes or siloxanes having at least two silicon hydride functionalities.

4. The hydrosilylation reaction curable composition of claim 3 wherein the mixture of cross-linking compounds comprises diphenylsilane and hexamethyltrisiloxane.

5. The hydrosilylation reaction curable composition of claim 4 wherein the mixture comprises from 20 to 80 mole % diphenylsilane based on the total moles of crosslinkers with the remainder being hexamethyltrisiloxane.

6. The hydrosilylation reaction curable composition of claim 5 wherein the mixture comprises 70 mole % diphenylsilane and 30 mole % hexamethyltrisiloxane.

7. The hydrosilylation reaction curable composition of claim 1 further including a reaction inhibitor.

8. A process for preparing a hydrolsilylation reaction cured composition comprising the steps of:
   a) providing a silsesquioxane polymer comprising a copolymer resin having the empirical formula $R^1_a R^2_b R^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen;
   b) providing a mixture of silanes or siloxanes as a cross-linking compound;
   c) mixing the components of a), b), to form a curable composition;
   d) adding a hydrosilylation reaction catalyst to the curable composition of step c)
   e) curing the curable composition of step d) to form a cured resin having a fracture toughness that is greater than the fracture toughness of a cured composition utilizing any of the individual cross-linking compounds of the mixture alone.

9. The process of claim 8 wherein the curing step includes the steps of: 1) curing the curable composition in a mold at a temperature of 85° C. for 24 hours, 2) curing the the curable composition in a mold at a temperature of 150° C. for 24 hours, 3) curing the curable composition in a mold at a temperature of 200° C. for 24 hours.

10. The process of claim 8 wherein the silsesquioxane resin comprises $(PhSiO_{3/2})_{0.75}(ViMe_2SiO_{1/2})_{0.25}$, where Ph is a phenyl group, Vi represents a vinyl group, and Me represents a methyl group.

11. The process of claim 8 wherein the mixture of cross-linking compounds comprises: a silane having at least two silicon hydride functionalities or a siloxane having at least two silicon hydride functionalites.

12. The process of claim 11 wherein the cross-linking mixture of compounds comprises diphenylsilane and hexamethyltrisiloxane.

13. The process of claim 8 further including the step of adding a reaction inhibitor.

* * * * *

UNITED STATES PATENT AND TRADEMARK OFFICE
CERTIFICATE OF CORRECTION

PATENT NO.    : 6,689,859 B2
DATED         : February 10, 2004
INVENTOR(S)   : Li et al.

It is certified that error appears in the above-identified patent and that said Letters Patent is hereby corrected as shown below:

Title page,
Item [54], delete "HYDROSILYATION" and insert -- HYDROSILYLATION -- therefor.

Column 1,
Line 19, delete "semi-colon".

Column 4,
Line 18, delete "hydrosilyation" and insert -- hydrosilylation -- therefor.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,689,859 B2
DATED : February 10, 2004
INVENTOR(S) : Li et al.

It is certified that error appears in the above-identified patent and that said Letters Patent is hereby corrected as shown below:

<u>Title page,</u>
Item [73], Assignee: add
-- Massachusetts Institute of Technology, Cambridge, MA (US) --

Signed and Sealed this

Third Day of August, 2004

JON W. DUDAS
*Acting Director of the United States Patent and Trademark Office*